United States Patent [19]

Manion et al.

[11] 3,786,839

[45] Jan. 22, 1974

[54] HIGH INPUT IMPEDANCE FLUERIC AMPLIFIER

[75] Inventors: Francis M. Manion, Rockville; Joseph M. Kirshner, Bethesda, both of Md.

[73] Assignee: The United States of America as represented by the Secretary of the Army, Washington, D.C.

[22] Filed: Mar. 15, 1971

[21] Appl. No.: 124,610

Related U.S. Application Data

[63] Continuation-in-part of Ser. No. 800,650, Feb. 19, 1969, abandoned.

[52] U.S. Cl. .................................................. 137/837

[51] Int. Cl. .............................................. F15c 1/04

[58] Field of Search ........... 137/81.5, 837, 836, 838

[56] References Cited

UNITED STATES PATENTS

| | | | |
|---|---|---|---|
| 3,486,520 | 12/1969 | Hyer et al. | 137/81.5 |
| 3,158,166 | 11/1964 | Warren | 137/81.5 |
| 3,500,852 | 3/1970 | Bauer | 137/81.5 |
| 3,275,016 | 9/1966 | Wood | 137/81.5 |
| 3,433,260 | 3/1969 | Higgins | 137/81.5 X |
| 3,451,408 | 6/1969 | Evans | 137/81.5 |
| 3,578,009 | 5/1971 | Spyropoulos | 137/81.5 |

*Primary Examiner*—Samuel Scott
*Attorney, Agent, or Firm*—Harry M. Saragovitz et al.

[57] ABSTRACT

The amplifier includes a supply jet providing fluid to an interaction chamber and a pair of fluid outlet passages on the side of the chamber opposite the supply jet. A pair of control nozzles are provided on laterally opposite sides of the supply jet for deflecting the jet into one or the other of the outlet passages. A pair of supplementary nozzles in communication with the fluid supply are also located on opposite sides of the supply jet. The flow resistance through the supplementary nozzles is large so that as the jet is deflected by flow through the control nozzle, the supplementary flow increases due to decreased resistance and increases its support of the pressure field deflection. Accordingly, the control flow has a high input impedance requiring little control flow.

4 Claims, 4 Drawing Figures

INVENTORS
FRANCIS M. MANION
JOSEPH M. KIRSHNER

By: Harry M. Saragovitz, Edward J. Kelly, Herbert Berl, and J D Edgerton
ATTORNEYS

HIGH INPUT IMPEDANCE FLUERIC AMPLIFIER

This application is a continuation in part of Ser. No. 800,650 filed Feb. 19, 1969, and now abandoned.

The present invention relates to a flueric amplifier and particularly relates to a high input impedance flueric amplifier for impedance matching with high impedance inputs.

In a typical fluid amplifier, deflection of the fluid jet is accomplished by a pressure field or by momentum interaction. Usually, both of these contribute to the jet's lateral deflection at the outlet passages regardless of the system employed. Pressure field designs however yield higher and more positive deflection and higher pressure gains. However, this requires considerable control flow to support the lateral pressure field across the jet stream. The control flow is thus characterized by a low input impedance.

In a fluid amplifier system, for example, a system to perform a logic operation, a problem exists in feeding the output of a first device or sensor to the control for a second device where the second device requires a large control signal. For example, a sensor which typically has a high output impedance would be incapable of providing the control signal for an amplifier having a low input impedance. The present invention provides a flueric amplifier having a high input impedance and therefore an amplifier which can be matched with a sensor or output signal also having a like high output impedance. In addition to decreasing the control flow requirement and thereby providing a high input impedance amplifier, the present invention permits the design of both proportional and digital amplifiers.

To these ends, the present invention provides a flueric amplifier having a power jet fluid stream flowing into an interaction chamber in communication with a pair of outlet passages on the side of the interaction chamber opposite the power jet. A pair of control nozzles are provided on opposite sides of the fluid jet for deflecting the jet stream toward one or the other of the outlet passages. A pair of supplementary flow nozzles in communication with the primary power supply also open on opposite sides of the jet stream. In use, the small control signal or fluid flow to one of the control nozzles, for example, from a sensor or prior amplifier stage, tends to direct the jet stream toward one or the other of the outlet passages. As the jet flow is directed toward one of the outlet passages, the resistance offered through the supplementary flow nozzle on the same side of the jet stream as the control nozzle decreases thereby permitting additional supplementary flow of power fluid through that supplementary flow nozzle to further support the pressure field deflection. At the same time, the resistance offered through the supplementary flow nozzle on the other side of the jet stream increases. In other words, the small control flow varies the admittance of the supplementary nozzles so that the control flow modulates that supplementary flow which enlarges the pressure field deflecting the jet stream. Very little control flow is thus required to obtain the positive jet deflection. In this manner, the amplifier hereof presents a high input impedance to control signals emanating from a sensor or the like. In accordance with the present invention, the static pressure can be adjusted so that the control pressure level can be precisely matched to a particular sensor or input.

Additionally, the present flueric amplifier can provide digital or proportional action as desired. If the modulated supplementary flow exceeds the field pressure requirement, digital action results since the field pressure increases and continuously deflects the jet stream. To provide a proportional action between the outlet passages, the interaction chamber is provided with a pair of vents on opposite sides of the jet stream. The vent resistance can be varied to obtain proportional action. Decreasing the vent resistance decreases the pressure field for a given flow rate from the supplementary flow source thereby tending to proportion the flow through the outlet passages.

It is a primary object of the present invention to provide a high input impedance flueric amplifier.

It is another object of the present invention to provide an impedance matching fluid amplifier which is simple to construct and may be used with fluid elements in systems without intermediate devices.

It is still another object of the present invention to provide a high input impedance flueric amplifier having a digital or proportional output capability.

These and further objects and advantages of the present invention will become more apparent upon reference to the following specification, appended claims and drawings wherein:

Figure 1:
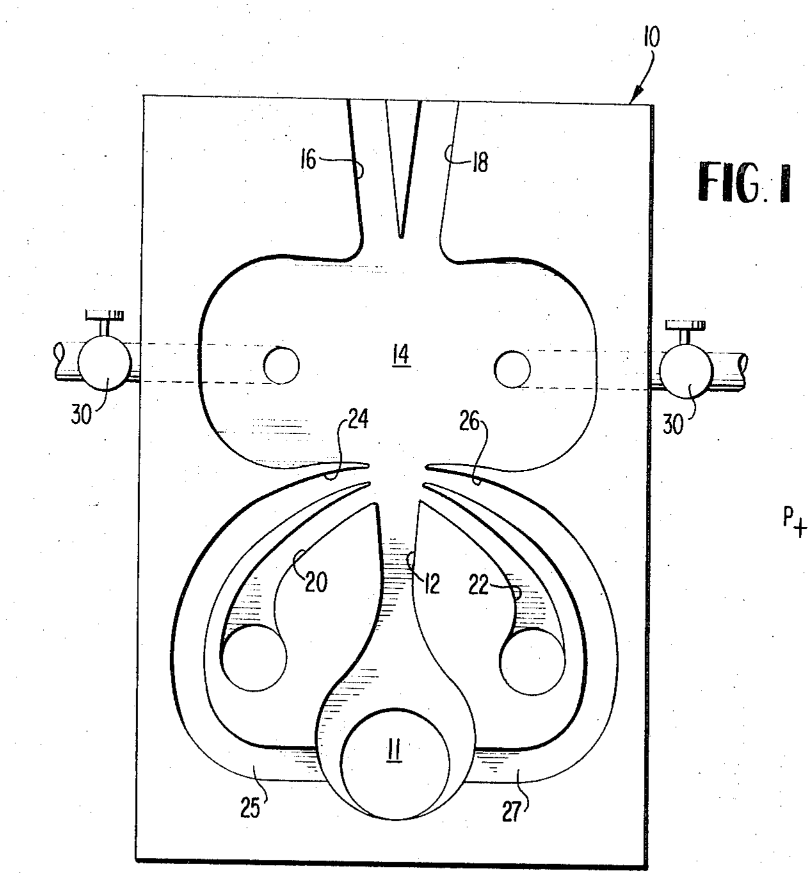
FIG. 1 is a diagrammatic illustration of a high input impedance flueric amplifier constructed in accordance with the present invention.

Referring now to the drawing, there is illustrated in FIG. 1 a high input impedance flueric amplifier comprising a housing 10 having a fluid supply source 11 under pressure, a reduced passage forming a jet nozzle 12 in communication with the fluid source, an interaction chamber 14 and a pair of output passages 16 and 18 communicating with the interaction chamber 14 on the side thereof opposite reduced passage 12. A pair of control nozzles or passages 20 and 22 are disposed on opposite sides of the fluid jet stream issuing from reduced passage 12. A pair of supplementary flow nozzles 24 and 26 also lie in communication with the fluid jet stream on opposite sides thereof and downstream from the control nozzles as seen in the embodiments illustrated in FIGS. 1 and 3. Supplementary flow nozzles 24 and 26 lie in communication with the fluid supply in chamber 11 via conduits 25 and 27 respectively.

The housing 10 may be formed of a laminated construction in the usual fashion with the inner panel of the lamination being etched, machined or otherwise formed to provide the passages and nozzles.

Prior art flueric amplifiers may comprise the foregoing described structure but without the supplementary flow passages 24 and 26. In such prior amplifiers, a control flow provided, for example, through control nozzle 22, tends to deflect the jet stream issuing from passage 12 into outlet passage 16. However, as the control flow in passage 22 is increased, the static pressure in the right-hand portion of the interaction chamber 14 rises, tending to produce leakage of the flow through outlet passage 18. To provide all of the flow issuing from reduced passage 12 to the outlet passage 16 would require a significant increase in the control flow to maintain the increased static pressure in the right-hand side of chamber 14. The prior flueric amplifiers accordingly have typically very low input impedances which cannot be matched to sensors or other devices having high output impedances without the interposition of an intermediate device whereby the impendances would be matched.

Figure 2:
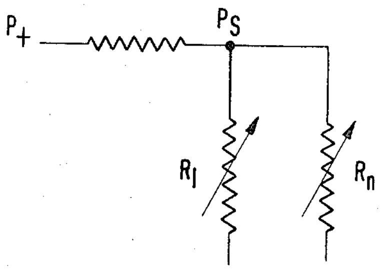
FIG. 2 is an electrical schematic illustrating the fluid flow to the nozzles on one side of the amplifier.

To eliminate the high control flow required in the pressure field to provide a positive jet stream deflection, and to provide a high input impedance to the amplifier, the present flueric amplifier is provided with the supplementary flow passages 24 and 26 which provide fluid under pressure preferably from the power supply on opposite sides of the jet stream. Referring to FIGS. 1 and 2, there is shown in FIG. 2 an electrical schematic illustrating the supply flow through the supplementary and primary flow nozzles. In FIG. 2, $R_n$ represents the resistance of the supplementary flow nozzle and $R_1$ represents the resistance of the primary nozzle or passage 12. The resistance through the supplementary nozzles is so much greater than the resistance through the primary nozzle that the static pressure of the system remains substantially constant irrespective of the change of resistance in the supplementary flow nozzle. The resistance of the supplementary nozzle is however, dependent upon its relation to the jet stream issuing from the primary nozzle 12. For example, when the jet stream is deflected by the control flow for communication with outlet passage 16, it will be seen that the resistance to flow through the supplementary flow passage 24 is increased whereas the resistance to supplementary flow through flow passage 26 has decreased. Thus, as the jet stream is deflected toward one or the other of the outlet passages 16 or 18 under the influence of the control flow, the area between the supplementary flow nozzle and the jet stream on the opposite side of the jet stream increases permitting additional supplemental flow through that supplemental flow passage to support the pressure field. In this manner, very little control flow is required and accordingly the control flow passages present high input impedances to the outputs from associated sensor or like device. The static pressure of the system can be adjusted so that the control pressure level can be exactly matched to a particular sensor, and this can be accomplished by an adjustment in the flow through primary nozzle 12 by suitable means, not shown.

In order to achieve this desired relationship between the resistance of the supplementary nozzles and the input impedance at the control flow passages it is necessary that the area between the supplementary nozzles and the jet stream be limited. Assuming the case where the jet stream is undeflected, the area between the supplementary nozzles and the jet stream should be less than W/2 where W is the width of the supplementary nozzles. Under these circumstances the downstream supplementary nozzles act as flapper jets and the power stream is squeezed between these two jets to act as a flapper plate.

It will be seen that digital action is provided. If the modulated supplementary flow exceeds the field pressure requirement, the field pressure increases and continuously deflects the jet thereby providing digital action.

A pair of vents are provided in communication with interaction chamber 14 on opposite sides of the jet stream. By selectively varying the resistance through the vents by, for example, suitable gates 30, a proportional action can be obtained. For example, decreasing the vent resistance on one side of the chamber 14 decreases the pressure field on that side of the jet stream thereby proportioning the flow. Note that the control flow is still minimal while higher deflection and higher pressure gains are obtained.

Figure 3:
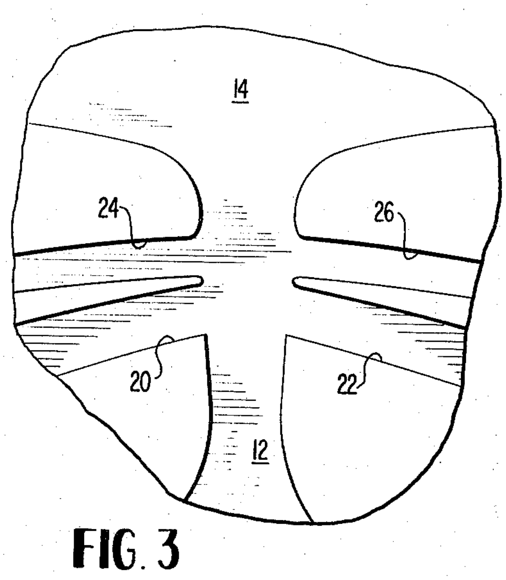
FIG. 3 is a diagrammatic illustration of another form of the amplifier hereof.

Referring now to FIG. 3, there is shown another form of the flueric amplifier hereof having supply, control and supplementary nozzles as in the previous embodiment, but having a specifically configured wall downstream of the supplementary flow nozzles. In this form, the nozzle walls are curved so that the lateral position of the jet stream issuing from primary nozzle 12 actually controls the flow through the supplementary nozzles.

Figure 4:
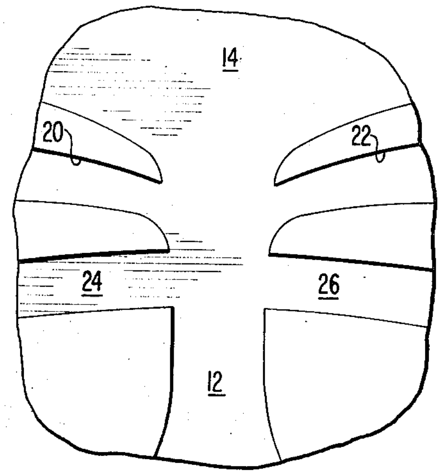
FIG. 4 is a diagrammatic illustration of still a further form of the amplifier hereof.

In the form hereof illustrated in FIG. 4, the positions of the supplementary and control nozzles are reversed. That is, the supplementary flow nozzles are located upstream of the control nozzles and between the supply nozzle and the control nozzle. Thus, the control nozzles actually see the chamber pressure and this can be matched to the control pressure. Again, minimal control flow would be required.

In each of the foregoing embodiments, the small control flow varies the admittance of the supplementary nozzle such that the control flow modulates the supplementary flow which significantly enlarges the pressure field and which, in turn, deflects the jet stream toward one or the other of the outlet passages 16 or 18. Nominal control flow is required such that for the same jet deflection, less flow through the control nozzle is required than in typical prior art flueric amplifiers. Accordingly, the present amplifier has a high input impedance which can be readily matched to the typical high output impedance of sensors and like devices.

Amplifiers in accordance with the invention can be made much smaller than prior art because of reduced control flow. Small sized amplifiers have an increased viscous transport loss of signal flow from stage to stage. This limits the practical size prior art amplifier because losses cancel the gain. In the present invention the reduced control flow decreases the viscous losses permitting important reduction in practical amplifier size. In the amplifier configuration of FIG. 1, there would be an increased static pressure in the output passage to the control input of the following stage, but a reduction in flow so that viscous losses would be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid amplifier comprising a housing, a primary nozzle carried in said housing for providing a primary fluid jet stream, an interaction chamber in said housing and in communication with said nozzle, a pair of outlet passages carried by said housing on the opposite side of said chamber from said nozzle for receiving of the fluid jet stream issuing from said nozzle, a pair of control nozzles in said housing on opposite sides of the jet stream for receiving a control fluid to deflect the jet stream, a pair of supplementary flow nozzles connected to said primary nozzle and having a width W and spaced from the primary fluid jet stream by a distance less than W/2, said supplementary flow nozzles being directed toward said jet stream such that deflection of said jet stream creates additional supplementary flow to further support the pressure field deflection, said housing having a wall portion above the jet stream and immediately downstream of the supplementary flow nozzles and being curved in a direction such that the distance between the wall and the jet stream increases in a downstream direction, whereby said control flow modulates the supplementary flow as to minimize the control flow required to effect deflection of the jet stream.

2. A fluid amplifier according to claim 1 including a pair of vents on opposite sides of the jet stream in said interaction chamber, and means for varying the resistance of flow through said vents to provide a flow proportioning action through the outlet passages.

3. A fluid amplifier according to claim 1 wherein said control nozzles lie upstream of said supplementary flow nozzles.

4. A fluid amplifier according to claim 1 wherein said control nozzles lie downstream of said supplementary flow nozzles.

* * * * *